United States Patent [19]

Usher et al.

[11] Patent Number: 4,871,181
[45] Date of Patent: Oct. 3, 1989

[54] REINFORCED SQUEAK FREE SEAL FOR EXHAUST COUPLINGS

[75] Inventors: Peter P. Usher, Union; Eugene J. Gavaletz, Toms River; John Slonksnes, South Amboy, all of N.J.

[73] Assignee: Metex Corporation, Edison, N.J.

[21] Appl. No.: 36,338

[22] Filed: Apr. 9, 1987

[51] Int. Cl.⁴ .................... F16J 15/12; F16L 27/06
[52] U.S. Cl. .................... 277/229; 277/106; 277/235 R; 285/267; 285/268; 285/368; 285/910
[58] Field of Search .............. 277/289, 230, 235 R, 277/206, 205, 106; 285/342, 368, 910, 412, 378, 275, 281, 267, 268

[56] References Cited

U.S. PATENT DOCUMENTS

| | | |
|---|---|---|
| 848,549 | 3/1907 | Hawley et al. . |
| 1,153,942 | 9/1915 | Mills .................... 285/910 X |
| 1,521,483 | 12/1924 | Stevens . |
| 1,777,101 | 9/1930 | McCormack . |
| 1,783,762 | 12/1930 | Yarnall et al. . |
| 1,979,141 | 10/1934 | Clark et al. . |
| 2,059,775 | 11/1936 | Clark .................... 285/910 X |
| 2,354,538 | 7/1944 | Parker . |
| 3,167,324 | 1/1965 | Kratochvil . |
| 3,186,042 | 6/1965 | Daley . |
| 3,271,039 | 9/1966 | Kohl et al. .................... 277/230 X |
| 3,301,577 | 1/1967 | Latham . |
| 3,477,731 | 11/1969 | Workman . |
| 3,770,284 | 11/1973 | Galloway . |
| 3,894,742 | 7/1975 | Trelease .................... 277/229 X |
| 4,082,326 | 4/1978 | Bryson .................... 285/342 X |
| 4,156,533 | 5/1979 | Close et al. .................... 277/229 |
| 4,417,733 | 11/1983 | Usher . |
| 4,427,220 | 1/1984 | Decker .................... 285/267 X |
| 4,441,726 | 4/1984 | Uhl .................... 277/230 |
| 4,457,491 | 7/1984 | Dudman . |
| 4,516,782 | 5/1985 | Usher . |
| 4,548,415 | 10/1985 | Bendl .................... 277/101 |
| 4,549,741 | 10/1985 | Usher et al. . |
| 4,601,476 | 7/1986 | Usher et al. . |
| 4,659,091 | 4/1987 | Baasner et al. . |

FOREIGN PATENT DOCUMENTS

| | | | |
|---|---|---|---|
| 69265 | 10/1974 | Australia .................... | 285/342 |
| 3248417 | 6/1984 | Fed. Rep. of Germany ...... | 285/910 |
| 149471 | 9/1983 | Japan .................... | 285/368 |

Primary Examiner—Allan N. Shoap
Attorney, Agent, or Firm—Amster, Rothstein & Ebenstein

[57] ABSTRACT

A substantially squeak-free heat cured exhaust seal adapted to be interposed between a pair of confronting pipes in sealing relationship therewith, comprises a one-piece substantially rigid grommet and a heat cured seal body of annular configuration and flat radial surfaces of different area at either end. The seal body comprises a mixture of metallic fibers, non-metallic filler, a thermally stable lubricant and a resin binder, and the grommet covers the entire inner circumference of the seal body, at least partially the large flat radial surface at one end of the seal body, and optionally at least partially the small flat radial surface of the seal body at the other end thereof.

8 Claims, 3 Drawing Sheets

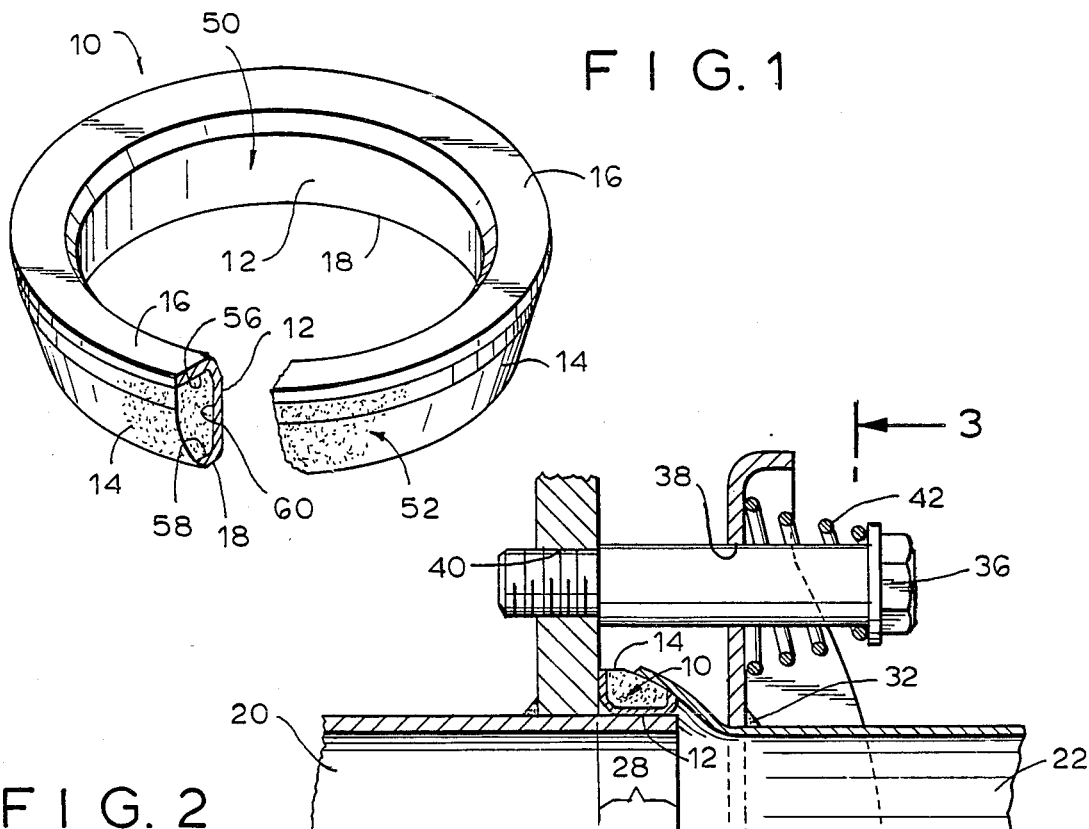
FIG. 1
FIG. 2
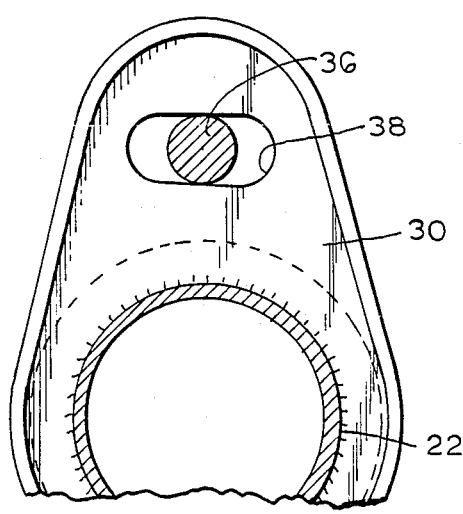
FIG. 3

REINFORCED SQUEAK FREE SEAL FOR EXHAUST COUPLINGS

BACKGROUND OF THE INVENTION

The present invention relates to high temperature seals of the type used in automobile exhaust systems and, more particularly, to a reenforced exhaust seal capable of relatively noiseless operation.

Typically in the new front wheel drive automobiles, the engine is mounted so that its crankshaft runs transversely with respect to the vehicle body. The exhaust systems for these "transversely mounted engines" include an exhaust manifold pipe which extends downwardly alongside the engine and has a flange at its open end. Due to the normal movement of the engine during operation (resulting from the rotational momentum of the crankshaft and opposing torsional forces of the drive shaft), the exhaust manifold pipe flange reciprocates in such a manner that the central axis of the pipe, which is perpendicular to the plane of the flange, departs from a substantially vertical line and becomes inclined alternately towards the front and rear of the vehicle. It is therefore necessary to use a flexible joint between the exhaust manifold and the tail pipe to absorb this movement which would otherwise be communicated directly to the tail pipe, causing intolerable stresses and strains and resulting in metal fatigue and the accelerated failure of the tail pipe.

It will therefore be understood that with a transversely mounted engine, the exhaust seal in the flexible joint (typically a ball and socket type joint) connecting the exhaust manifold with the tail pipe must be capable of permitting a degree of relative rotation between the exhaust manifold and exhaust pipe and still maintain an effective exhaust gas seal.

U.S. Pat. Nos. 4,417,733 and 4,516,782 describe an exhaust seal in which a flexible sheet of refractory material (graphite in the latter patent) is used to form the rubbing surfaces of the seal, which seal has been found to permit a degree of relative rotation between the exhaust manifold and tail pipe while still maintaining an effective exhaust gas seal. During use of the exhaust seal described in U.S. Pat. No. 4,516,782 as well as other graphite surfaced seals, it has been found that audible sounds or squeaks can be generated as the opposing members of the articulated exhaust pipe joint move with respect to each other and rub against the surfaces of the seal. The audible sounds, while not affecting the actual performance of the seal, can in some circumstances be considered to be annoying.

U.S. Pat. No. 4,601,476 describes an exhaust seal comprising wire mesh and a mixture of metallic fibers, non-metallic filler (such as graphite flakes), a thermally stable lubricant (such as silicone fluid) and resin binder, the mixture surrounding the wires of the mesh and substantially filling the openings in the mesh and forming the seal. The thermally stable lubricant is believed to become coated on the non metallic filler, thereby preventing squeaking of the graphite surface. While such a seal has proven to be substantially squeak free and satisfactory for general use, there are particular high-temperature applications, involving what is believed to be a certain degree of relative rotation between the exhaust manifold and tail pipe, where the longevity of the seal has not proven to be as great as desired. Failed seals have evidenced cracks and wearing away in and about the junction of the inner circumference of the seal and the large flat radial surface thereof.

Accordingly, it is the object of the present invention to provide a reenforced exhaust seal for use in an articulated joint which will not squeak in response to sliding frictional forces resulting from the moving of the joint members, yet prevents exhaust gas leakage.

Another object is to provide such a seal which is reenforced for use in high temperature applications and is not subject to cracking or crumbling during use.

A further object is to provide such a seal which is simple and inexpensive to manufacture.

SUMMARY OF THE INVENTION

It has now been found that the above and related objects of the present invention are obtained in a heat cured exhaust seal adapted to be interposed between a pair of confronting pipes in sealing relationship therewith. The seal comprises a one-piece substantially rigid grommet and a heat cured seal body of annular configuration and flat radial surfaces of different area at either end. The seal body comprises a mixture of metallic fibers, non-metallic filler, a thermally stable lubricant and a resin binder. The grommet is coextensive with the inner circumference of the seal body and extends over at least 20% of the area of the large flat radial surface at one end of the seal body and at least partially the small flat radial surface of the seal body at the other end thereof.

In a preferred embodiment the grommet comprises a body portion, a first flange adjacent one end of the body portion, and a second flange adjacent an opposite end of the body portion. The grommet body portion covers the entire inner circumference of the seal body, the first flange covers at least 90% of the large flat radial surface of the seal body, and the second flange covers at least 50% of the small flat radial surface of the seal body.

Preferably, the metallic fibers comprise steel wool, the non-metallic filler comprises graphite flakes, the resin binder comprises phenolic resin, and the thermally stable lubricant comprises silicone fluid. The thermally stable lubricant is coated on the non-metallic filler. The grommet is preferably composed of stainless steel, ordinarily covers the entirety of the large flat radial surface of the seal body, and small flat radial surface of said seal body, leaving exposed the outer circumference of the seal body to provide a substantially squeak-free seal.

Another embodiment of the present invention comprises an extreme-temperature tolerant annular sealing element, adapted to form a seal between a rotatable opposed member having a partial cup-like sealing surface and a body member, comprising a heat cured seal body and a protective metallic sheath. The heat cured seal body comprises a mixture of metallic fibers, non-metallic filler, a thermally stable lubricant and a resin binder. The body is of annular configuration and defines an inner circumferential surface adapted to receive the body member, a curved outer circumferential surface adapted for sealing line contact with the rotatable opposed member, a flared small radial surface adapted for disposition adjacent the rotatable opposed member, and a flared large radial contact surface adapted for sealing contact with the body member. The one piece substantially rigid protective metallic sheath is affixed to the seal body and is coextensive with at least the inner circumferential surface of the body and at least a portion of the large radial contact surface. Preferably the seal is substantially squeak-free, and the sheath covers at least a portion of the small radial surface.

In a preferred embodiment, the sheath is formed from stainless steel and covers substantially the entirety of the seal body save for the outer circumference thereof. Wire mesh may be disposed intermediate the large radial contact surface of the seal body and the sheath. Alternatively, the sheath may be wire mesh, metal foil, or a multi layer sheath consisting of wire mesh and metal foil, preferably with the metal foil substantially disposed inwardly of the wire mesh.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken into conjunction with the accompanying drawing wherein:

FIG. 1 is a fragmentary isometric view, partially in section, of an exhaust seal according to the present invention showing the expanded grommet and seal body mixture therein;

FIG. 2 is a fragmentary side elevation view, partially in section, showing the exhaust seal of FIG. 1 disposed in operative position between an exhaust manifold and the tailpipe of an automobile;

FIG. 3 is a view taken along the line 3—3 of FIG. 2;

DETAILED DESCRIPTION OF THE PREFERRED EMBODIMENTS

Figure 4:
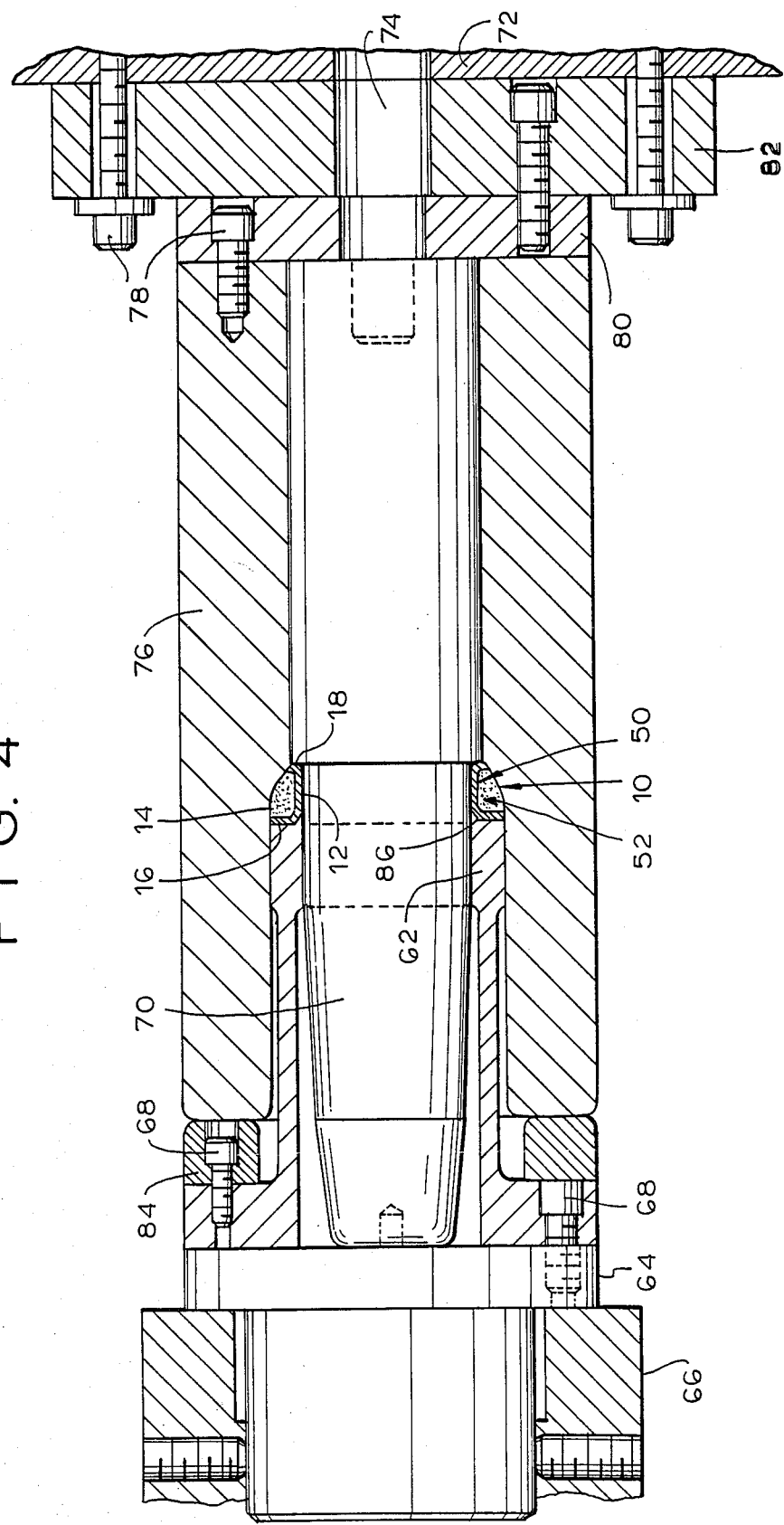
FIG. 4 is a front elevation view of a press in which the exhaust seal of the present invention may be made.

Referring now to the drawing, and in particular to FIG. 1 thereof, an exhaust seal according to the present invention is designated generally by the reference numeral 10. The seal 10 is preferably in an endless ring form as shown, and has an inner circumferential surface 12, an outer circumferential surface 14, a large radial surface 16 (shown as an upper flange in FIG. 1) and a small radial surface 18 (shown as a lower flange in FIG. 1). The circumferential surface 14 and large radial surface 16 are formed to sealingly engage confronting surfaces on pipes to be joined to one another, as described immediately herein below so that the reader can fully appreciate the forces and conditions to which the several surfaces of the seal are subjected during use thereof.

Referring to FIG. 2, the seal 10 of the present invention is shown positioned in a "ball and socket" type joint of the kind intended for use in exhaust systems of transversely mounted automobile engines. The joint is made between confronting ends of pipes 20 and 22, the pipe 20 defining a port for an exhaust manifold (not shown) and the pipe 22 being an automobile exhaust tail pipe which is usually secured underneath the auto as by flexible clamping means (not shown).

It will be understood that during engine operation, the pipe 20 will undergo rotative movement relative to tail pipe 22 such as described earlier. Seal 10 is strong enough to withstand the stresses produced by relative movement while providing a seal which prevents exhaust gas leakage.

For reasons evident from an inspection of FIG. 2, the small radial surface 18 is sometimes referred to as the leading surface while the large radial surface 16 is sometimes referred to as the trailing surface. The outer circumferential surface 14 is occasionally referred to as the spherical surface, while the inner circumferential surface 12 is occassionally referred to as the ID or inside diameter surface.

In the typical joint configuration of FIGS. 2 and 3, the exhaust manifold pipe 20 has a flange 24 securely joined thereto in the vicinity of its open end, as by weld 26, for example. A portion 28 of pipe 20 is allowed to extend forwardly of flange 24 for a distance sufficient to allow the seal 10 to be inserted thereover, as shown in FIG. 2. It will be appreciated that the inner circumferential surface 12 of the seal 10 is preferably in substantial contacting relationship with the outer surface of the forward pipe portion 28, thereby requiring that the inner diameter of the seal 10 be substantially equal to the outside diameter of the exhaust manifold pipe 20. While preferably the inner circumferential surface 12 of the seal 10 sealingly engages the outer circumference of the pipe 20, some clearance therebetween is provided to facilitate assembly of the seal/pipe composite. Hot gases passing through this clearance are, however, blocked by the sealing engagement of the large radial surface 16 and the forward surface of flange 24.

Exhaust tail pipe 22 has a flange 30 securely joined thereto near its open end, the flange 30 being welded at 32 to pipe 22, for example. Extending forwardly of flange 30 is an outwardly flared section 34 of tail pipe 22, the inside surface of the flared section 34 being preferably accurately formed as is the circumferential outer bearing surface 14 of seal 10, so that the seal bearing surface 14 defines the "ball" and the flared section inside surface forms the "socket" of the joint. The section 34 may also be conically tapered so as to maintain a line contact seal against the outer seal surface 14. The seal of the present invention will therefore perform satisfactorily when bearing against a conically tapered pipe surface, as well as against a complimentarily shaped arcuate pipe surface as shown in FIG. 2.

The opening defined by flared portion 34 is of an extent sufficient to overextend the forward pipe portion 28, thereby permitting the present seal 10 to be disposed between the confronting ends of the pipes 20 and 22, respectively. It will be appreciated that the seal 10 is mounted to sealingly engage the outer surface of forward pipe portion 28 and the inner surface of the flared portion 34 when these pipe portions are urged towards one another as explained below.

A pair of bolts 36 extend through corresponding openings 38 in flange 30. Significantly, the openings 38 are slotted as shown in FIG. 3 so as to provide for rocking movement of the bolts 36, this movement being caused by the movement of manifold pipe 20 during engine operation. Bolts 36 threadingly engage corresponding threaded openings 40 provided through flange 24 on manifold pipe 20. It will therefore be understood that as the manifold pipe 20 is caused to rotate relative to tail pipe 22, the bolts 36 will be free to rock back and forth within the slots 38.

The bolts 36 urge the flange 30 towards flange 24 by way of compression springs 42 disposed between the heads of bolts 36 and the opposed surface of flange 30. It will be apparent that the above mentioned sidewise movement of bolts 36 will not be appreciably restrained by springs 42 when using the configuration of FIGS. 2 and 3.

With the seal 10 in the position shown in FIG. 2, it will also be apparent that it is restrained from relative axial movement due to its abutment on one side against the flange 24, and the abutment of its outer circumferential bearing surface 14 in sealing relationship with the inside of the flared pipe portion 34. However, the seal 10 tolerates relative rotative movement between the confronting surfaces of the pipes 20 and 22 as by permitting movement of the tail pipe flared portion 34 over its outer circumferential bearing surface 14. Seal 10 can also absorb an unusually high degree of stress resulting from such movement and still maintain an effective seal.

While the foregoing description has been primarily directed to applications of the seal 10 in which relative rotative movement and stress must be tolerated by the seal during operating conditions, it will be understood that the seal of the present invention may be effectively used in other applications, not only in the automotive field, but in many others, such as marine and aviation, for example, regardless of whether or not the relative rotative movement or stress is present there. The seal 10 is, however, especially useful in those instances where relative rotative movement and stress will be present. It has been found that such relative rotative movement of the joined members tends to cause rotation of the seal 10 relative to at least one of the members as well, with a resultant severe stress of the seal 10 especially at the inner circumferential surface 12 thereof, to only a somewhat lesser degree at the large radial surface 16 thereof (especially the portions thereof adjacent the inner circumferential surface 12), and in some instances the small radial surface 18 thereof as well.

Returning now to the description of the structure of the exhaust seal 10 according to the present invention, as illustrated in FIG. 1, the seal 10 is comprised of a one-piece of substantially rigid grommet, generally designated by the reference numeral 50, and a heat cured seal body generally designated by the reference numeral 52. The seal body 52 is of angular configuration with flat radial surfaces 56, 58. Thus the seal body 52 defines a large flat radial surface 56 at the trailing edge, a small flat radial surface 58 at the leading edge, an inner circumferential surface 60 and an outer circumferential surface 14. The grommet 50 defines an inner circumferential surface 12 which is coextensive with the entire inner circumferential surface 60 of the seal body, a large flat radial surface 16 which covers at least 20% of the area the large flat radial surface 56 at the trailing edge of the seal body 52 (and preferably at least 90%), and a small flat radial surface 18 which at least partially covers the small flat radial surface 58 at the leading edge of the seal body 52 (and preferably covers at least 50% of the area). Thus the grommet 50 provides additional reinforcement for the seal body 52 in those areas most requiring it, the inner circumferential surface, the portion of the large radial surface adjacent thereto and at least a part of the small radial surface.

The seal body 52 is a compressed mixture of metallic fibers, non-metallic filler, a thermally stable lubricant, and a resin binder.

The metallic fibers of the powder mixture which is added to the die cavity is preferably made up of chopped steel wool, although chopped bronze wool or chopped metallic wire (e.g. brass, copper, steel, etc.) may also be employed. The non-metallic filler is preferably made up of graphite flakes, although boron nitride or mica may also be used. Further, the non-metallic filler may also include metallic oxide powders having refractory characteristics, such as titanium dioxide, in place of or in combination with the other filler materials.

Before the non-metallic filler material is mixed with the metallic fibers and resin binder to form the powder mixture, it is mixed with a fluid having a high lubricity and thermal stability, such as a silicone fluid. The lubricity of the fluid is believed important in achieving the noiseless operation of the finished seal, while the thermal stability of the fluid is thought to be necessary to allow the fluid to undergo curing without any drastic chemical changes. Mixing the thermally stable lubricant with the non-metallic filler serves to coat the particles with the lubricant, which is the presently preferred method of dispersing the lubricant throughout the powder mixture. However, it will be readily appreciated that any method which achieves a uniform dispersion of the components of the powder mixture may be employed.

A preferred silicone fluid is a silicone fluid of the dimethyl type, although other silicone fluids such as phenyl based silicone fluid can be used for suitable applications. In the preferred embodiment of the present invention, dimethyl silicone fluid is thoroughly mixed with the graphite flakes which constitute the non-metallic filler. It is thought that, because of the laminar structure and porosity of the graphite flakes, the dimethyl silicone fluid coats the surface and penetrates the pores of the graphite flakes.

The thorough mixture of the thus coated graphite flakes with the metallic fibers and resin binder in the powder mixture assures the dispersion of the dimethyl silicone fluid or lubricant throughout the finished seal body 52. It is believed that, during use of the seal in an automotive exhaust system, the interior portion of the seal does not reach temperatures sufficiently high to decompose the silicone fluid therein. As a result, it is theorized that there is a continuous exposure of small amounts of silicone fluid at the sliding surface of the seal (i.e., the outer circumferential surface 14) which serves to modify the frictional forces acting thereon sufficiently to prevent squeaking.

The resin binder is preferably a phenolic resin, although a furfural alcohol resin may also be used as well as any resin binder which provides a high carbon yield when pyrolyzed. Specifically, during normal use in an automotive exhaust system, the seal is subjected to temperatures in excess of 600–700 F. At these temperatures the phenolic resin binder decomposes into a carbonaceous mass. This carbonaceous mass is desirable as it serves as an extremely tenacious binder within the seal and creates a gas impermeable barrier. It will therefore be appreciated that any resin binder providing a high carbon yield when pyrolyzed may be used.

Referring now to FIG. 4, the seal 10 of the present invention may be formed in a conventional press-mounted compression die having a cavity configured and dimensioned to produce the desired size and shape of the finished seal. Such a conventional press-mounted die typically includes a die punch 62 is secured to the movable ram or adapter 64 of a hydraulic press 66, for example, by screws 68. A movable die pin 70 having a slight inward taper at its upper end is secured to a press table 72 by means of a movable rod 74, the die pin 70 and movable rod 74 being disposed within the central aperture of a die barrel 76 secured to the same press table by means of screws 78, a base plate 80 and base 82. The bottom of the die cavity, formed between the inside of the upper portions of the die barrel 76 and the outside of the upper portion of the die pin 70, defines the small fillet radius which slopes upwardly and outwardly to promote formation of the small radial surface 18 of the grommet. A stop 84 on the die punch 62 determines the extent to which the punch can enter the annulus between the die pin 70 and die barrel 76. The movable rod 74 is capable, after the pressing operation, of moving upwardly sufficiently to enable the formed seal 10 to be grasped by a tool for removal from the die pin 70, such removal being facilitated by the slight taper of the die pin 70.

To form the seal a powder mixture of metallic fibers, non-metallic filler coated with a thermally stable lubricant, and a resin binder is first poured into the die cavity. As the cavity is approximately four inches in length, the powder mixture poured into the die cavity may be three inches deep or even more. A commercially available partially formed grommet 50 (i.e., the grommet with the large radial flange 16 already formed) is then introduced leading straight edge first into the die cavity, the grommet typically being straight except for the trailing preformed large radial surface flange 16. Generally most, if not all, of the grommet 50 would be disposed within the die cavity before the grommet is contacted by the die punch 62. As the die punch 62 descends in the die cavity the grommet 50 is pushed lower and the lower length thereof is eventually turned over by the slope of the bottom of the die cavity to form the small flat radial surface 18. In the process, the powder mixture is compressed between the grommet flanges 16, 18. Typical compression stresses for forming a seal are in the vicinity of 35,000 psi, but higher or lower stresses can be used to accommodate various shapes and material ratios.

The compressed seal is then ejected from the die cavity by raising the movable die pin 70 until the compressed seal can be grasped by a tool and removed therefrom. The compressed seal is then cured in a furnace at temperatures in the range of 375°–475° F. for approximately 30 minutes. This curing process permits the resin binder to exhibit its adhesive properties to further bond the powder mixture and grommet of the seal 10.

It will be appreciated that the die punch 62 preferably has a slight bevel 86 on its inner edge to further turn over the large radial flange 16 of the grommet 50 during the die compression step, thereby to provide a corresponding bevel 88 (see FIG. 1) in the finished seal 10 so that the seal can accommodate any fillet at the intersection of the pipe 20 and its flange 24.

The degree to which the small flat radial surface 18 of the grommet 50 covers the small flat radial surface 58 of the powder mixture depends upon the length of the grommet at the time of its introduction into the die cavity. For example, a grommet with a height of 0.745 inch, a large radial surface extending to a 2.820 inch diameter and a straight leading edge may form after compression a seal with a height of 0.555 inch, a large radial surface extending to a 2.820 inch diameter and a leading small radial surface. The extent to which the small flat radial surface 18 of the grommet covers the small flat radial surface 58 of the seal body will also be a function of the degree to which the die punch enters the die cavity, further intrusion into the die cavity by the die punch acting to cause greater coverage. Closing of the grommet or formation of the small flat radial surface 18 is accomplished by the small fillet radius (say, 0.080 inch) at the end of the compression stroke. The radius stretches the edge of the grommet and causes it to flow from an axial to a radial position, following the same principles as used in conventional grommet closing dies. The grommet is preferably fabricated from Type 309 or other stainless steels, but other materials able to withstand the contemplated thermal and corrosive degradation may be used in place thereof——for example, the nickel alloy available under the trade name Inconel 600, available from International Nickel Co.

While the heat cured seal body 52 provides the squeak-free connection to pipe 22, the grommet serves numerous useful functions. First, a high degree of axial reinforcement is provided by the clamping action between the large and small flanges 16, 18 of the grommet 50. This results in a high mechanical integrity, making the finished seal 10 more capable of withstanding damaging forces induced by mechanical shock and friction at the spherical sliding surface 14. Second, the grommet provides radial reinforcement against any disruptive forces which are applied to the seal from the extruded circular shape. Third, the grommet reduces the amount of attrition which would otherwise occur at the large radial surface 56 of the seal body as a result of rotation of the seal, such wear being capable of causing a reduction of the axial height of the seal and thus eventual failure thereof. Fourth, the small flange 18 of the grommet 50 serves as a gas impingement surface in installations in which this end of the seal opposes the flow of exhaust gas from an exhaust manifold, the seal body itself having only a limited resistance to such direct impingement. Fifth, the grommet 50 protects the seal body from the disruptive effect of high temperatures by limiting any axial thermal expansion thereof and thereby preserving the strength and integrity of the seal body.

It will be appreciated that in order to achieve the highly desirable squeak-free feature of the present invention, the outer circumferential surface 14 of the seal body 52, or at least that portion thereof which may come into contact with the inner surface of the outwardly flared section 34 of tailpipe 22, must be left exposed (that is, uncovered by the grommet 50).

Alternatively, the grommet may be formed from an imperforate metal foil preform constructed from one or more spiral convolutions of foil having a joint overlap secured, for example, by electrical resistance welds. The width of the foil, which determines the height of the seal, should be arranged to be greater than the depth of the uncompressed powder mixture when installed in the die cavity. The thickness of the foil is about 0.001–0.015 inch, depending on the strength and formability requirements.

Figure 5:
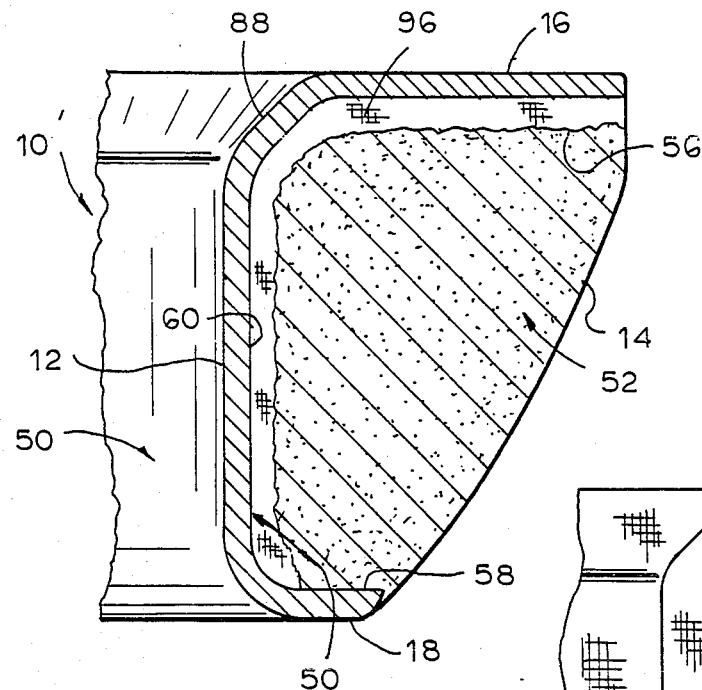
FIG. 5 is a fragmentary isometric view to an enlarged scale, partially in section, of a modified embodiment of the exhaust seal of FIG. 1 having a wire mesh liner.

While the imperforate metal grommet 50 provides great strength to the heat cured seal body 52, it also tends to transmit severe jolts and shocks straight through to the seal body without attenuation. Additionally, the different thermal coefficients of expansion for the seal body 52 and grommet 50 can lead to the development of internal stresses. Accordingly, as shown in FIG. 5, for particular applications it may be desirable to use a second embodiment 10' of the present invention wherein a knitted wire mesh 96 or other perforate metal foil is disposed on the inner surface of the grommet 50 as a liner intermediate the imperforate surface of the grommet and the large radial contact surface 56 and inner circumferential surface 68 of the seal body 52. In addition to enhancing the strength of the seal, the mesh 96 provides cushioning of the seal body against sudden jolts and vibrations and accommodates the differentials in thermal expansion so as to reduce the amount of stress produced thereby. In order to develop the desired irregular conformance of the wire mesh 96 during the compression stage, the wire mesh should initially extend for two to six times the height of the compressed seal. The collapsing of the wire mesh 96 anchors the heat cured seal body against the outer surface of the grommet.

Figure 6:
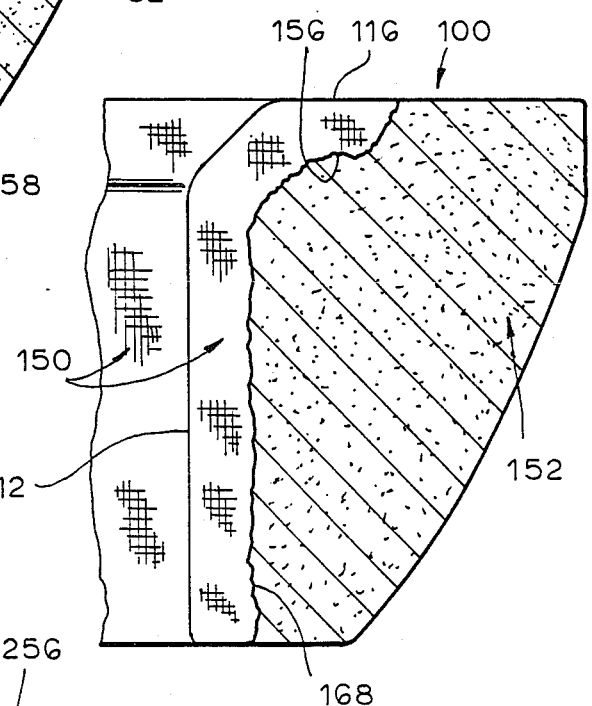
FIG. 6 is a fragmentary isometric view, partially in section, of another embodiment of an exhaust seal according to the present invention showing the wire mesh (used as the sheath) and the seal body mixture therein.

Referring now to FIG. 6, therein illustrated is a third embodiment 100 of the present invention. Elements in the third embodiment 100 corresponding to generally similar elements of the first embodiment 10 have been designated with corresponding 3 digit reference numerals in the 100 series. The imperforate grommet 50 has been replaced by a sheath 150 of wire mesh having an inner circumferential surface 112 extending over the entire inner circumferential surface 168 of the heat cured seal body designated by the reference numeral 152 and a large radial surface 116 extending over at least a portion of the large radial surface 156 of the seal body 152.

Figure 7:
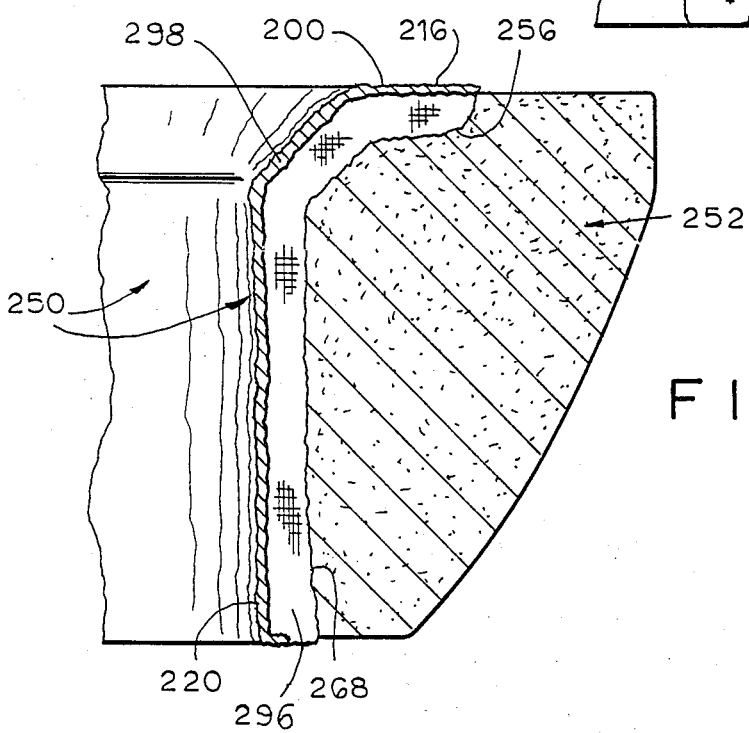
FIG. 7 is a fragmentary isometric view, partially in section, of another embodiment of an exhaust seal according to the present invention showing the metal foil and metal mesh composite (used as the sheath) and the seal body mixture therein.

Referring now to FIG. 7, therein illustrated is a fourth embodiment 200 of the present invention. Elements in the fourth embodiment 200 corresponding to generally similar elements of the first embodiment 10, have been designated with corresponding 3 digit reference numerals in the 200 series. The grommet 50 in seal 200 has been replaced by a multi-layer sheath 250 having an inner circumferential surface 220 extending over the entire inner circumferential surface 268 of the heat cured seal body and a large radial surface 216 extending over at least a portion of the large radial surface 256 of the heat cured seal body 252. The composite sheath 250 is formed of an inner layer of imperforate metal foil 298 and an outer layer of knitted wire mesh 296, although for particular applications the two layers may be interchanged——that is, an inner layer of knitted wire mesh 296 and an outer layer of imperforate metal foil 298. In a typical exhaust seal to be fabricated with this method, the composite sheath is fabricated by folding the edges of a piece of 2.5 inch wide foil around the edges of a piece of 2.0 inch wide knitted wire mesh in such a manner that the folded material is approximately two inches wide, with foil completely covering one side of the mesh and one-quarter inch wide borders of folded-over foil on the opposite mesh face. In between the borders, there remains approximately a 1.5 inch wide band of uncovered mesh. A sufficient length of this folded structure is rolled into ring form, with the foil covered face at the inside diameter and the one-quarter inch borders at the top and bottom of the ring. The ring is sized to be slip fit onto the die pin, and the joint overlap is arranged to be approximately one eighth to one quarter inch to provide sufficient area for resistance welding. After welding the joint in at least two places, the sheath is complete and ready to be assembled into a seal in a conventional compression die press.

In assembling the seal, the two inch high sheath is pushed onto the die pin and down into the die cavity until the bottom edge contacts the bottom of the die. Next the powder mixture is introduced into the die cavity and distributed uniformly between the outside of the sheath and the inside of the die barrel. The powder level must be at approximately the same level as the top of the sheath, within approximately plus or minus twenty five percent of this position, to achieve the most desired results of this invention. Upon pressing the die charge to the final seal height, about $\frac{1}{2}$ to $\frac{1}{3}$ the original sheath height, the sheath buckles in a saw toothed fashion and the powder mixture in the vicinity of the buckling foil and knitted wire mesh becomes mechanically locked to the sheath. Upon completion of pressing, the crumpled sheath extends completely along the inside circumference of the seal, up through the beveled region and into the large flat radial surface. The seal is then heat cured to react with the powdered resin binder and complete the fabrication process. The crumpled sheath forms a very tough reinforcing anchor for the powder mixture, for the full axial length of the seal, thereby affording increased breaking strength.

While the sheath has only the large flange 16, without the small flange 18 of the grommet 50, and thus cannot provide the clamping action between the large and small flanges found in the grommet, nonetheless a high degree of axial reinforcement and retention is provided by the collapsed metal at the inside circumference of the seal, regardless of whether that metal is the collapsed metal foil or the collapsed wire mesh.

To summarize, the present invention provides a reinforced exhaust seal for use in an articulated joint which will not squeak in response to sliding frictional forces resulting from the moving of the joint members, yet prevents exhaust gas leakage. This seal is reinforced for use in high temperature applications and is not subject to cracking or crumbling under use, yet is simple and inexpensive to manufacture.

Now that the preferred embodiments of the present invention have been shown and described in detail, various modifications and improvements thereon will become readily apparent to those skilled in the art. Accordingly, the spirit and scope of the present invention is to be limited only by the appended claims, and not by the foregoing disclosure.

What is claimed is:

1. A heat cured exhaust seal for an articulated ball-and-socket type joint adapted to be interposed between a pair of confronting pipes biased together in sealing relationship therewith, comprising
   (A) a one-piece substantially rigid grommet;
   (B) a heat cured seal body of annular configuration and flat radial surfaces of different area at either end, said seal body comprising a mixture of metallic fibers, non-metallic filler, a thermally stable lubricant and a resin binder, said grommet being coextensive with at least the inner circumferential surface of said seal body, at least 20% of the large flat radial surface at one end of said seal body and at least partially the small flat radial surface of said seal body at the other end thereof; and
   (C) wire mesh disposed intermediate said grommet and the entirety of said inner circumferential surface and at least partially said large flat radial surface of said seal body.

2. A substantially squeak-free extreme-temperature tolerant annular sealing element adapted to form a seal for an articulated ball-and-socket type joint between a rotatable opposed member having a partial cup-like sealing surface and a body member biased together, said sealing element comprising:
  (A) a heat cured seal body comprising a mixture of metallic fibers, non-metallic filler, a thermally stable lubricant and a resin binder, said body being of annular configuration and defining an inner circumferential surface adapted to receive said body member, a curved outer circumferential surface adapted for sealing line contact with said rotatable opposed member, a small flared surface adapted for disposition adjacent said rotatable opposed member and a large flared contact surface adapted for sealing contact with said body member;
  (B) a one-piece substantially rigid protective metallic sheath affixed to said seal body, said sheath being coextensive with at least said inner circumferential surface of said body and at least a portion of said large flared contact surface; and
  (C) wire mesh disposed intermediate said sheath and the entirety of said inner circumferential surface and at least partially said large flared contact surface of said seal body.

3. The seal of claim 2 wherein said seal body, said sheath, and said wire mesh are integrated into a one-piece construction.

4. A substantially squeak-free extreme-temperature tolerant annular sealing element adapted to form a seal for an articulated ball-and-socket type joint between a rotatable opposed member having a partial cup-like sealing surface and a body member biased together, said sealing element comprising:
  (A) a heat cured seal body comprising a mixture of metallic fibers, non-metallic filler, a thermally stable lubricant and a resin binder, said body being of annular configuration and defining an inner circumferential surface adapted to receive said body member, a curved outer circumferential surface adapted for sealing line contact with said rotatable opposed member, a small flared surface adapted for disposition adjacent said rotatable opposed member and a large flared contact surface adapted for sealing contact with said body member; and
  (B) a substantially rigid protective metallic sheath affixed to said seal body, said sheath being coextensive with at least said inner circumferential surface of said body and at least a portion of said large flared contact surface, said sheath comprising a multi-layer sheath consisting of wire mesh and metal foil.

5. The sealing element of claim 4 wherein said metal foil is substantially disposed coaxially inwardly of said wire mesh.

6. The sealing element of claim 4 wherein said sheath is also coextensive with at least a portion of said small flared surface.

7. The seal of claim 6 wherein said grommet, said seal body, and said wire mesh are integrated into a one-piece construction.

8. The seal of claim 6 wherein said seal is substantially squeak-free and extreme-temperature tolerant.

* * * * *